United States Patent [19]
Baum

[11] Patent Number: 5,460,369
[45] Date of Patent: * Oct. 24, 1995

[54] COMPOSITE BASEBALL BAT

[75] Inventor: Charles S. Baum, Traverse City, Mich.

[73] Assignee: The Baum Research & Development Company, Inc., Traverse City, Mich.

[ * ] Notice: The portion of the term of this patent subsequent to May 19, 2009, has been disclaimed.

[21] Appl. No.: 137,694

[22] Filed: Oct. 15, 1993

Related U.S. Application Data

[63] Continuation of Ser. No. 883,263, May 14, 1992, abandoned, which is a continuation-in-part of Ser. No. 518,782, May 4, 1990, Pat. No. 5,114,144.

[51] Int. Cl.[6] ................................. A63B 59/06
[52] U.S. Cl. ...................................... 273/72 R
[58] Field of Search ................. 273/72 R, 72 A, 273/67, DIG. 23, DIG. 8, 82 R, 803, 735; 428/106, 285, 35.6; 156/245; 440/101

[56] References Cited

U.S. PATENT DOCUMENTS

| | | | |
|---|---|---|---|
| 400,354 | 3/1889 | Morris . | |
| 2,352,533 | 6/1944 | Goldman | 273/720 |
| 2,379,006 | 6/1945 | Johnson | 273/72 |
| 2,793,859 | 5/1957 | Darling et al. | 273/72 |
| 2,895,737 | 7/1959 | Blees | 273/26 |
| 4,014,542 | 3/1977 | Tanikawa | 273/72 R |
| 4,032,143 | 6/1977 | Mueller et al. | 273/72 R |
| 4,200,479 | 4/1980 | Ardell et al. | 156/154 |
| 4,331,330 | 5/1982 | Worst | 273/72 R |
| 4,543,284 | 9/1985 | Baum | 428/106 |
| 4,572,508 | 2/1986 | You | 273/72 R |
| 4,615,936 | 10/1986 | Baum | 428/285 |
| 4,689,257 | 8/1987 | Baum | 428/106 |
| 4,705,273 | 11/1987 | Ament et al. | 273/72 R |
| 4,848,745 | 7/1989 | Bohannan et al. | 273/72 R |
| 4,931,124 | 6/1990 | Baum | 156/245 |
| 5,114,144 | 5/1992 | Baum | 273/72 R |

*Primary Examiner*—Mark S. Graham
*Attorney, Agent, or Firm*—Gifford, Krass, Groh, Sprinkle, Patmore, Anderson & Citkowski

[57] ABSTRACT

A baseball bat or the like comprises a tube formed with an outer layer of wood veneer covering a layer of fiber reinforced resin, with the tube layers being impregnated with and bonded to one another with a cured resin. The ends of the tube are closed off with caps adhered to the tube by cured resin. The tube may be hollow and may have a foam plastic core with sufficient resiliency to allow the tube to resiliently deform during impact with a baseball. The tube formed by molding over a tubular end which may constitute the foam core or, alternatively, the forming mandrel may be removed after the resin is cured and the resulting cavity filled with foam plastic.

9 Claims, 4 Drawing Sheets

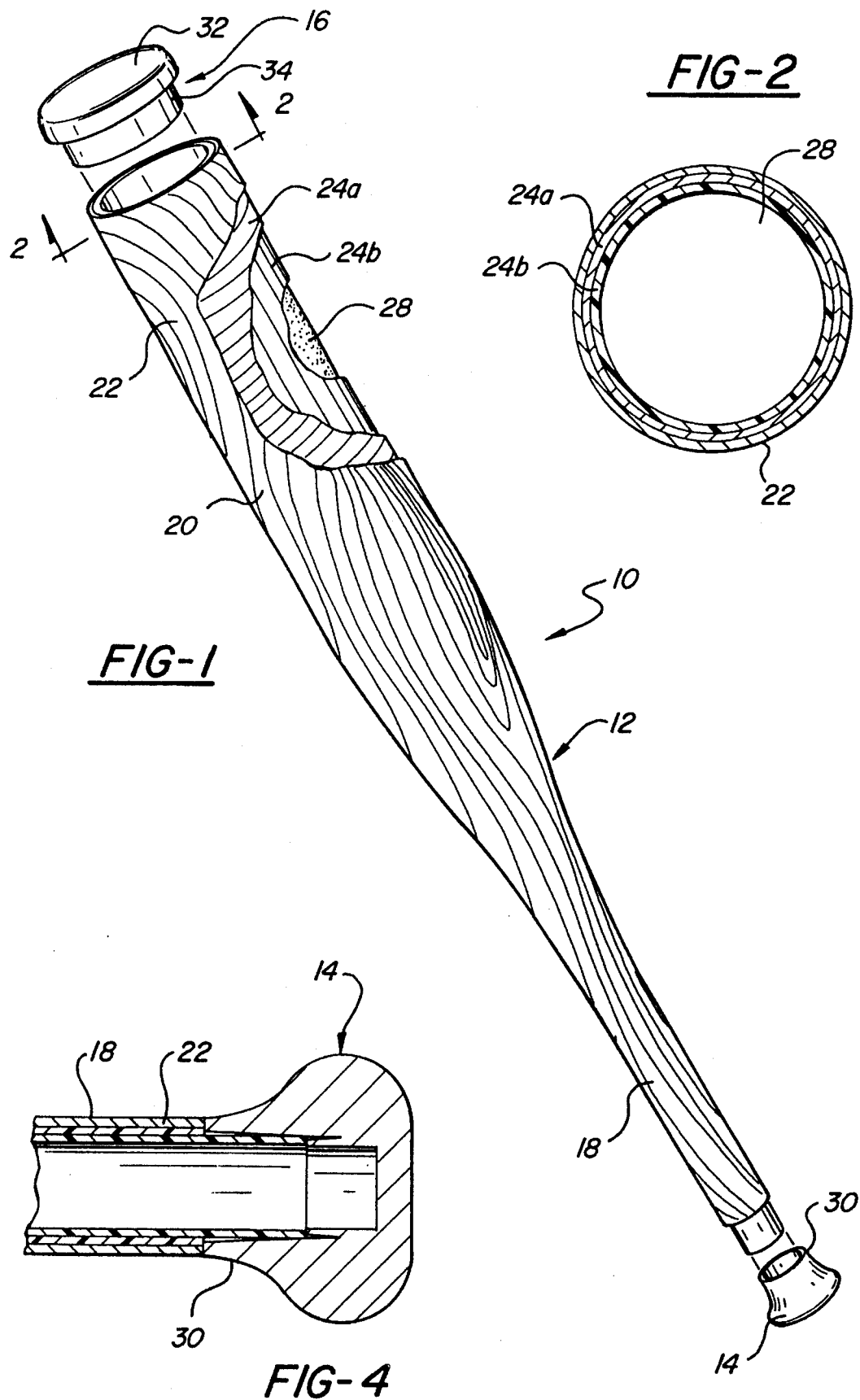

COMPOSITE BASEBALL BAT

RELATED APPLICATION

This is a continuation of application Ser. No. 07/883,263 filed on May 14, 1992, now abandoned, which is a continuation-in-part of Ser. No. 07/518,782, filed May 4, 1990, now U.S. Pat. No. 5,114,144.

FIELD OF THE INVENTION

This invention relates to baseball bats or the like comprising a cylindrical tube of wood veneer overlying a fiber reinforced resin layer, with the resin impregnating and bonding together the two layers, and to methods of forming such devices.

BACKGROUND OF THE INVENTION

My U.S. patent application Ser. No. 518,782 discloses a baseball bat or the like formed of a tube having an outer layer of wood veneer overlying an inner layer of fiber reinforced resin, with the two layers being impregnated with and bonded together with cured resin. Such bats have the desirable aesthetic appearance of solid wood bats, are much less susceptible to breakage in use than solid wood bats and can be designed to emulate the performance of either solid wood bats or exceed the performance of the livelier aluminum bats with larger sweet-spots. The present invention is directed toward improved versions of such bats and to methods of making the bats.

SUMMARY OF THE INVENTION

The present invention is directed to articles such as bats, drum sticks, furniture legs or the like, formed of cylindrical tubes. The preferred embodiment of the present invention takes the form of a baseball bat which tapers from a relatively narrow handle section into a larger diameter, bulbous, barrel section. The outer layer of the bat consists of one or more sheets of thin wood veneer. A single veneer sheet may be employed in which case the grain of the sheet is preferably arrayed parallel to the longitudinal axis of the bat. If a plurality of veneer sheets are used their grains are preferably crossed relative to one another.

The wood veneer layer is formed by cutting a pair of longitudinally extending sections of appropriately varying width, imprinting at least one of the sections with a logo, and pre-shaping the sections the into semi-cylindrical configuration by soaking them with solvent and then shaping them in dies while a solvent is driven off by heat.

The wood veneer layer formed of these two preshaped sections overlies and is adhered to a tubular layer formed of multiple sheets of resin-reinforced, high tensile strength fiber fabric such as glass, carbon, ceramic or Kevlar. The fiber orientations of the multiple layers are angled relative to one another. The fiber sheets may be knitted or woven and are preferably formed as a tubular sock by edge seaming two longitudinally aligned sections. A pair of the socks, with their seams displaced by 90° relative to one another are arrayed over a shaped form which may either constitute a mandril to be later removed or a permanent foam core for the bat. The fiber fabric is then coated with resin in liquid form, or preimpregnated fabric may be used, and the two veneer sections are positioned over the fabric. The resin is then cured while the veneer is pressed against the fiber layer either by means of a vacuum bag or matched dies. In the preferred embodiment of the invention, employing a removal mandrel as a form, curing is accelerated by heating the formed composite at a suitable curing temperature for the resin. When the composite is formed over the foam plastic core the curing temperature must be limited to prevent damage to the core.

After curing over a mandrel, the mandrel is removed, a preformed knob end is fitted over the open handle end of the tube, a preformed fiberglass cap is fitted over the barrel end, and both are adhered to the tube with resin. In the preferred embodiment of the invention, a self-foaming plastic resin compound, preferably a urethane, is injected into the tube through a small hole in one of the bat ends. The two components of the resin react within the tube, filling the tube with a foamed core. Preferably, the volume of urethane components injected is varied along the length of the tube to create a higher density foam at the barrel end than at the handle end, shifting the center of gravity of the bat toward the barrel end.

Alternatively, the tube may be closed off at the handle end and the barrel end without filling it with foam to provide a hollow bat. When the resin impregnated outer tubes are cured directly over a foamed core, the handle end is fitted with a preformed knob and the barrel end with a preformed cap.

In the embodiments of the bat with foamed cores, the density of the foam is limited so that when the bat impacts a pitched ball, the tubular outer layers deform inwardly, locally compacting the core. The same localized deformation occurs with a hollow core bat formed in accordance with the present invention, but the hollow core bat also undergoes a larger hood, radial distortion. By appropriately controlling the strength of the fiber-reinforced resin layers, the bats of the present invention may be made to completely simulate the performance of a solid wood bat or, alternatively, exceed the performance of the livelier aluminum bats with their larger sweeter spots.

Other objectives, advantages and applications of the present invention will be made apparent by the following description of several preferred embodiments of the invention.

BRIEF DESCRIPTION OF THE DRAWINGS

The description makes reference to the accompanying drawings in which:

FIG. 1 is a perspective, exploded, partially broken-away view of a bat, representing a preferred embodiment of the present invention;

FIG. 2 is a sectional view through the bat of FIG. 1 taken along line 2—2 of FIG. 1;

FIG. 4 is a partial, longitudinal cross-sectional view through the handle end of the bat of FIGS. 1 and 2, illustrating the handle and cap;

DETAILED DESCRIPTION OF THE PREFERRED EMBODIMENT

Figure 3:
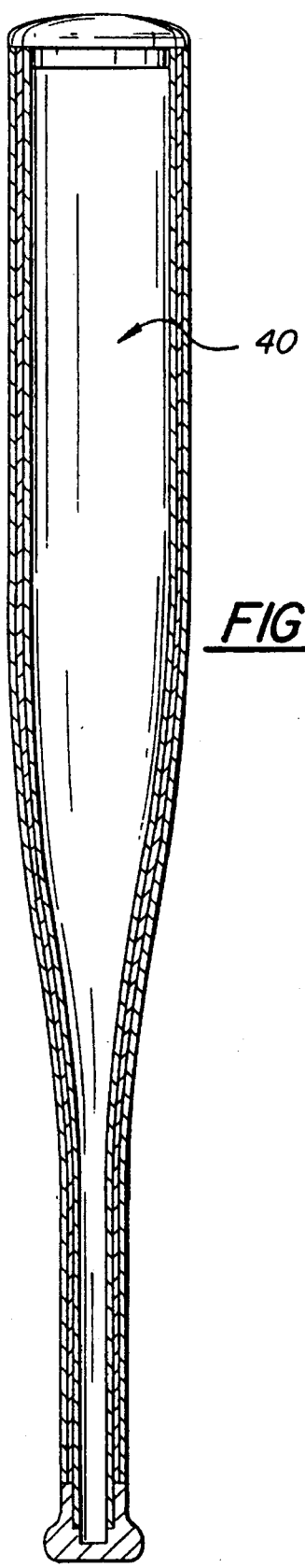
FIG. 3 is a sectional view through an alternative embodiment of the bat having a hollow core.

While the present invention is not limited to baseball bats, and extends to similar articles such as drum sticks, furniture legs and the like, a bat constituting a preferred embodiment of the invention is illustrated in FIGS. 1 and 2. The bat, generally indicated at 10 in exploded form, consists of a tubular section 12, a handle knob generally indicated at 14 and a barrel cap generally indicated at 16. The tube 12 has an outer configuration and dimensions like those of conventional prior art bats which are formed of solid wood, aluminum tubing, or fibre reinforced resin. The bat is radially symmetrical about a centerline, and tapers from a relatively narrow handle end 18 to a larger diameter, bulbous, barrel end 20.

The outer surface of the bat is covered by a structural sheath of wood veneer 22 coated and impregnated with a cured epoxy resin. The outer wood veneer sheath 22 covers the entire tube 12. In the preferred embodiment of the invention the outer sheath 22 is formed of two longitudinally array strips or "planks" of white ash veneer of approximately ⅛ to 1/16 inch thickness. The term "plank" is used because the strips vary in width longitudinally so that when they are laid in side-by-side abutment with one another they form the outer contour of the bat without overlap. The strips are preferably laid with their grains extending longitudinally along the length of the bat to provide maximum longitudinal tensile strength and impact resistance. In alternative embodiments, each plank may be formed of a plurality of thinner sheets of wood veneer with their grains preferably arranged at angles to one another.

The veneer outer surface 22 overlays a tubular layer of high tensile strength, resin impregnated, fabric socks 24a, 24b. Only two socks are shown for purpose of illustration although a greater or lesser number of sheets may be used in alternative embodiments of the invention. The tube is filled with a core 28 of a resilient urethane foam, wood, or the like. As will be subsequently described in detail, the foam core may vary in density over the length of the bat, preferably with a higher density section adjacent the barrel end 20 to shift the center of gravity of the bat toward the barrel end and improve the impact strength of the barrel.

The handle end of the bat, illustrated in detail in FIG. 4, is closed off by the knob 14 which includes an extending cylindrical section 30 which is of the same outer diameter as the handle end 18 and abuts the termination of the wood veneer cover 22. The handle end 14 may be formed of plastic or solid wood.

Figure 5:
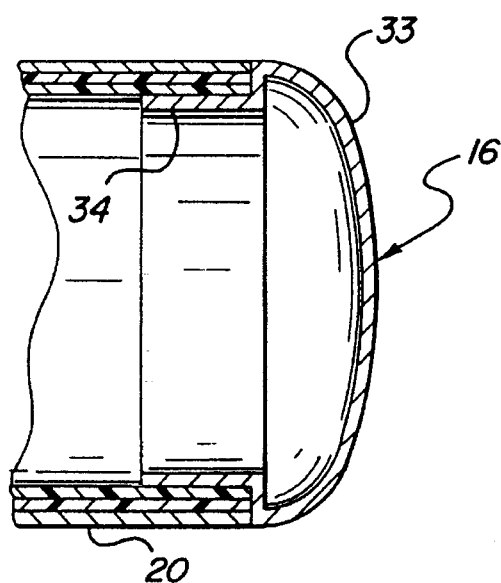
FIG. 5 is a partial longitudinal cross-sectional view through the barrel end of the bat of FIGS. 1 and 2 illustrating the barrel end cap.

Similarly, as illustrated in detail in FIG. 5, the barrel end of the tube 20 is terminated by the cap 16, preferably formed of fiber reinforced resin, which has a rounded end 32 and a tubular section 34 with an outer diameter which mates with the inner diameter of the fiber sections and is adhered thereto by resin.

Alternatively, the bat may be formed with a hollow core rather than a foam plastic core 28. A cross-sectional view of this alternative embodiment of the invention is illustrated in FIG. 3, generally at 40. The hollow core bat may otherwise be substantially identical to the foam core bat, although to achieve the same weighing, it is necessary to use heavier cloth socks 24a, 24b. A hollow aluminum core could also underlie the resin impregnated fabric layer.

Figure 6:
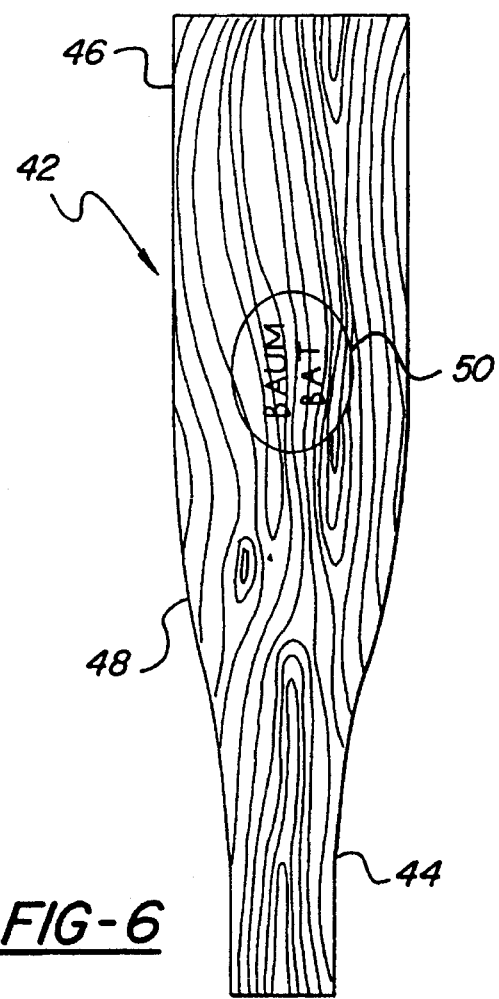
FIG. 6 is a side view of a section of wood veneer, cut to form one of the two sections used to cover the outer surface of the bat of the preferred invention and imprinted with the logo required on the finished bat.

One of the planks of wood veneer used to form the bat of the present invention is illustrated in FIG. 6. The veneer sheet 42 is cut from flat veneer stock by laser cutting, die cutting, router cutting, or like process so as to have the appropriate contour to cover half of a completed bat. The veneer section 42 includes a narrow, longitudinally extending handle section 44, a relatively wide barrel covering section 46 and a tapered section 48, joining the two. One of the two veneer sheets used to form the outer layer of the bat is preferably preprinted with a logo 50 while it is flat. The logo is preferably imprinted with an epoxy ink by a silk-screen process.

Figure 7:
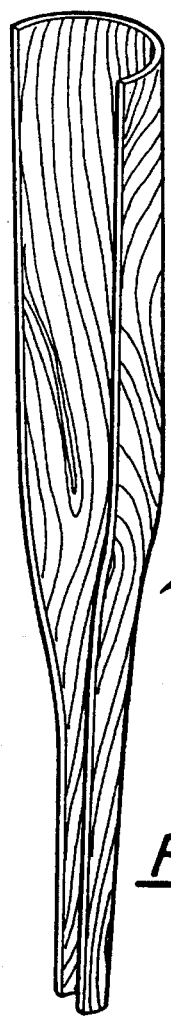
FIG. 7 is a perspective view of a veneer section after it has been preshaped for use in forming the bat of the present invention.

In the production of the bat, the plank 42 is preshaped into a semi-cylindrical configuration to create a preform generally indicated at 52 in FIG. 7. To achieve this preform shape the plank 42 is saturated with a liquid solvent such as water, alcohol or the like, is then shaped into the semi-cylindrical form in either matched dies or one die using a vacuum bag to pressure the plank 42 against the die, and the plank is heated to drive off the solvent. This process stretches the cellulose fibers of the veneer to achieve the semi-cylindrical shape 52. In alternative embodiments of the invention this preshaping step may be eliminated and the flat plank 42 may be shaped over the inner fabric layers as part of the same process that bonds the outer layer to the inner fabric.

Figure 8:
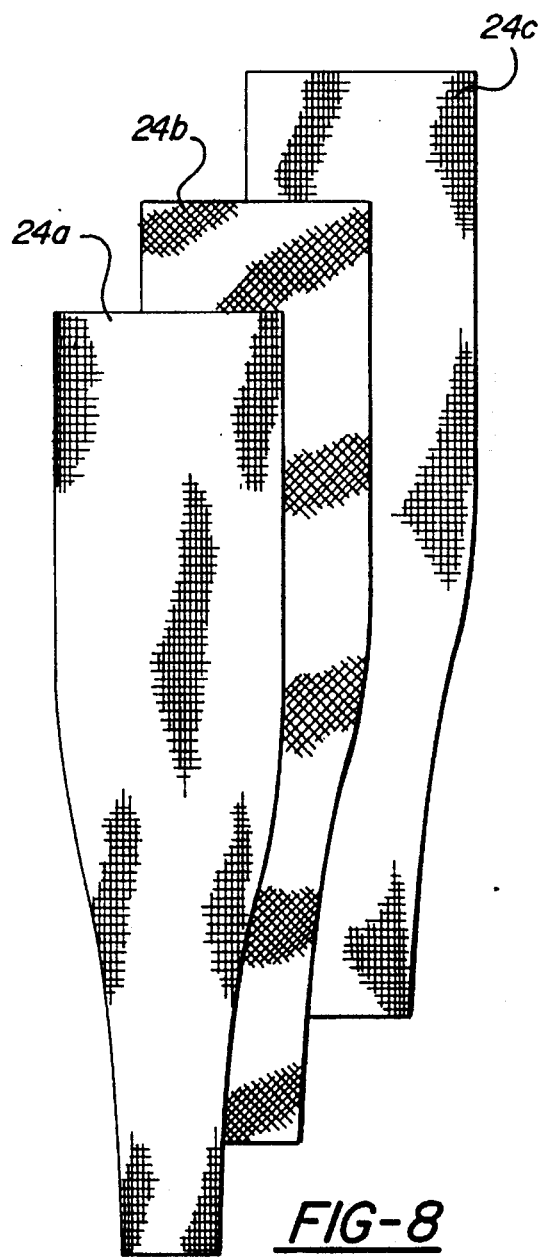
FIG. 8 is a view of multiple ply, knitted high tensile fiber fabric sheets cut to form a sock for use in forming the bat of the present invention.
Figure 10:
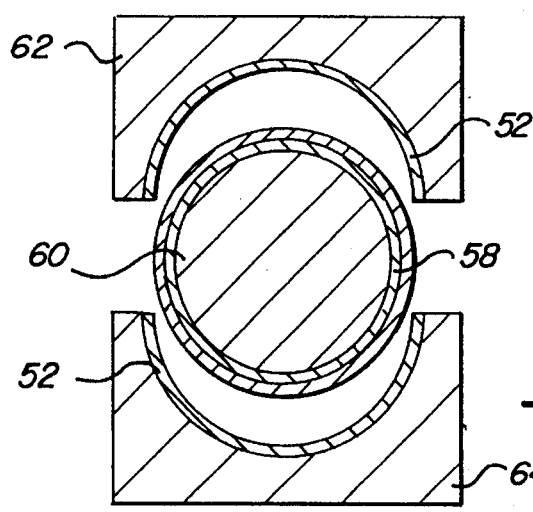
FIG. 10 is a sectional view through a resin-impregnated tube of wood veneer overlying a fiber sock, within the female dies used to form bats of the present invention.

The fabric socks 24 are preferably formed by stacking several sheets of fabric and cutting them into plank shape. A stack of three such "fabric planks" 54a, 54b, 54c are illustrated in FIG. 8. Any number of sheets may be employed, but the preferred embodiment utilized stacks of four sheets. These fabric sheets may be woven or knitted or formed by other process.

By appropriate choice of the nature of the layers, the stiffness, strength, flexibility and elasticity of the final bat may be controlled. The preferred composition creates a bat with such properties that when the ball impacts the bat during the batter's swing the bat undergoes a localized deformation conforming to the contact area of the baseball. It is important that foam core 28 be sufficiently resilient to allow this dual deformation which aids in the transfer of the kinetic energy of the swinging bat to the baseball. In the hollow core embodiment of the bat, illustrated in FIG. 3, the outer tube of the bat also elastically deforms to produce distortion of the overall cylindrical configuration of the bat as well as the more localized deformation conforming to the contact area of the ball.

Figure 9:
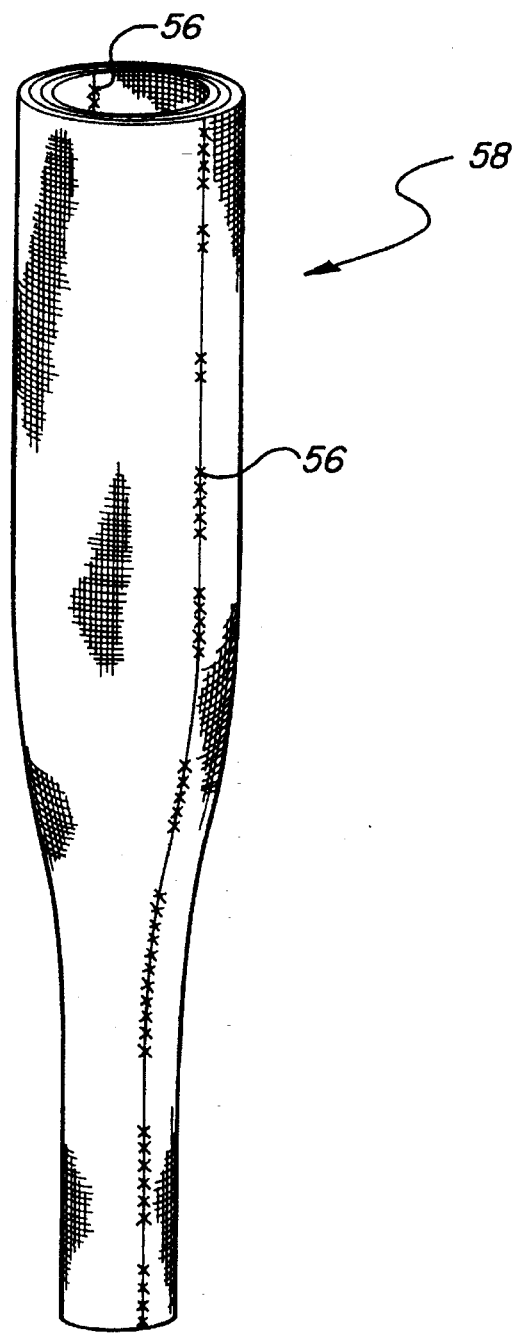
FIG. 9 is a perspective view of a multi-ply, high tensile fiber fabric sock formed by sewing together two stacks of cut fabric sheets, for use in forming the bat of the present invention.

After two stacks of plank shaped fiber sheets of the type illustrated in FIG. 8 are created they are preferably sewn together along their longitudinal edges, preferably using a zig-zag seamer or a butt-seamer along two lines 56, to form a cylindrical sock 24, generally illustrated in FIG. 9.

In the preferred method of forming the bat, this sock 24 is arrayed over an appropriately shaped aluminum mandrel 60 which has been precoated with a mold release compound. A second sock is then arrayed over the first sock with its seams displaced by 90° relative to the seams of the first sock.

In the preferred embodiment of the present invention, the fabric sock which directly overlies the mandrel 60 employs inner layers formed of DuPont Kevlar, or S-2 glass fiber and three overlying layers of graphite fiber. The Kevlar layer is preferably aligned with its fibers parallel to the longitudinal axis of the bat. The first graphite layer has its fibers arrayed circumferentially, at 90° to the first layer, the third and fourth layers have their fibers arrayed at 45° to the fibers of the first two layers. The Kevlar fabric is preferably K-49 type weighing 11.6 ozs. per square yard and is 2160 denier, 41 ends per inch. The three graphite layers are of type 6K-T300 weighing 5.5 ozs. per square yard and having 12.0 ends per inch. The four layers are preferably knitted together with a thin sheet of polyester film which is marked with the required plank pattern. These five layers are then cut together to form a plank.

A second sock is preferably formed of similar materials, but with a layer of fiber glass weighing 1 oz. per square foot, with its fibers arrayed circumferentially, overlying the outermost glass layer.

The socks are sewn using Kevlar K-49 thread with 12 needles per inch.

A pair of preshaped wood veneer planks 52 are then arrayed in matched female molds 62 and 64. The interior surfaces of the veneer preforms 52 are preferably coated with the liquid epoxy. The exterior, convex surfaces of the preforms 52 may or may not be coated with epoxy before their insertion in the mold 62,64. The fabric socks 24 are also thoroughly impregnated with the liquid resin and the molds are then closed over the sock coated mandrel 60 and the dies are heated to thoroughly cure the resin. The resin used preferably has a curing temperature in the vicinity of 300° F. The preferred resin composition is Reichold 37127 epoxy.

The resin may incorporate various additives such as natural rubber to improve the resiliency of the finished bat.

After the resin is cured, the assembly of the wood veneer preforms 52 and the sock 24 are removed from the die 62,64 and the mandrel 60 is removed from the barrel end of the tube. To form a hollow core bat this tubular section is finished by capping the handle end with cap 14 and joining the two by epoxy resin and finishing the barrel end by the cap 16, similarly adhered to the tube by epoxy resin.

Figure 11:
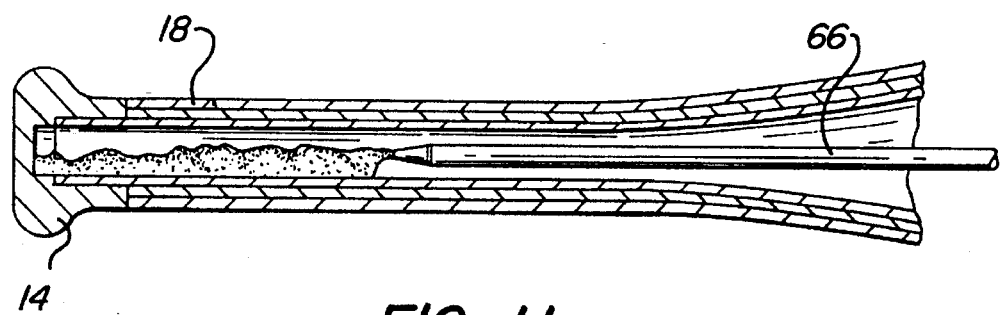
FIG. 11 is a sectional view of a cured bat tube formed in accordance with the present invention, with a knob fitted at the handle end, in the process of having self-foaming, liquid resin components being injected into the tube to form a foam plastic core by a foam-in-place technique.

To form the preferred embodiment of the bat with its foam core 28, the handle end of the bat is finished with the cap 14, as illustrated in FIG. 11 and the components of a self-foaming resin are injected into the preform through a tube 66 inserted through a small central hole in the open barrel end cap 16 which is later closed. The core is preferably a self-foaming urethane. Sufficient resin is injected to achieve a core density which may be in the range of 10–30 pounds per cubic foot. The quantity of liquid resin injected along the length of the tube may be adjusted to achieve a varying density foam. Preferably, the density of the foam at the barrel end is relatively high compared to the density adjacent the handle end to achieve a desirable end weighing.

Alternatively, the bat may be formed by using a prefinished core 60 of urethane foam or the like, formed in female aluminum split dies, instead of the mandrel 60. A weight of a high density material such as lead, may be imbedded in the barrel end of the core 60 to modify the weight distribution. The socks 24 are arrayed over the preformed foam core and impregnated with liquid resin, and the wood veneer preforms 52 are laid over the outer surface of the socks 24. The assembly is preferably cured in a vacuum bag placed within an autoclave. In this method of forming the bat the curing temperatures for the resin can be limited to avoid damage to the foam core, limiting the strength of the finished bat and increasing the curing time.

Rather than forming the fabric layers in the form of socks which are placed over the mandrel, the fabric layers may be formed by filament winding techniques or by "pulltrusion" techniques known in the composite art.

Having thus described my invention, I claim:

1. A baseball bat comprising:

a hollow tube tapering from a relatively small cross-section handle to a relatively large cross-sectional barrel end, the hollow tube consisting of a cylindrical outer layer of wood veneer, a cylindrical resin reinforced fiber inner layer comprising a plurality of sheets of fiber fabric, and resin impregnating both the outer layer of wood veneer and the fiber inner layer and adhering the outer layer of wood veneer to the fiber inner layer.

2. The bat of claim 1 in which the grain of the outer wood veneer extends parallel to the longitudinal axis of the bat.

3. The bat of claim 1 in which the resin constitutes an epoxy resin.

4. The bat of claim 1 in which at least certain of said fiber sheets are woven.

5. The bat of claim 1 in which at least certain of the fiber sheets are knitted.

6. The bat of claim 1 further comprising a resin reinforced fiber end cap for the barrel adhered to the tube by the resin.

7. A baseball bat comprising:

a tube tapering from a relatively small cross section handle end to a relatively large cross-sectional barrel end, the tube consisting of a cylindrical outer layer of wood veneer, a cylindrical resin reinforced fiber inner layer comprising a plurality of sheets of fiber fabric, and resin impregnating both the outer layer of wood veneer and the fiber inner layer and adhering the outer layer of wood veneer to the fiber inner layer; and a core comprising foam plastic, disposed within said tube.

8. The bat of claim 7 further including a high density weight supported within the foam core adjacent to the barrel end of the tube.

9. A baseball bat comprising a hollow tube tapering from a relatively small diameter handle end to a relatively larger diameter barrel end, the tube consisting of a cylindrical outer layer of wood veneer overlying a cylindrical inner layer of fiber reinforced resin, the fiber reinforced resin comprising a plurality of layers of fabric having their fibers aligned in differing directions with the layer directly contacting said wood veneer layer having at least certain fibers lying perpendicular to the grain of the wood veneer, the resin impregnating the fibers and the contacting wood veneer surface and adhering them to one another.

\* \* \* \* \*